W. H. HEULINGS, Jr.
CAR TRUCK.
APPLICATION FILED MAY 25, 1909.
1,000,407.
Patented Aug. 15, 1911.
6 SHEETS—SHEET 1.
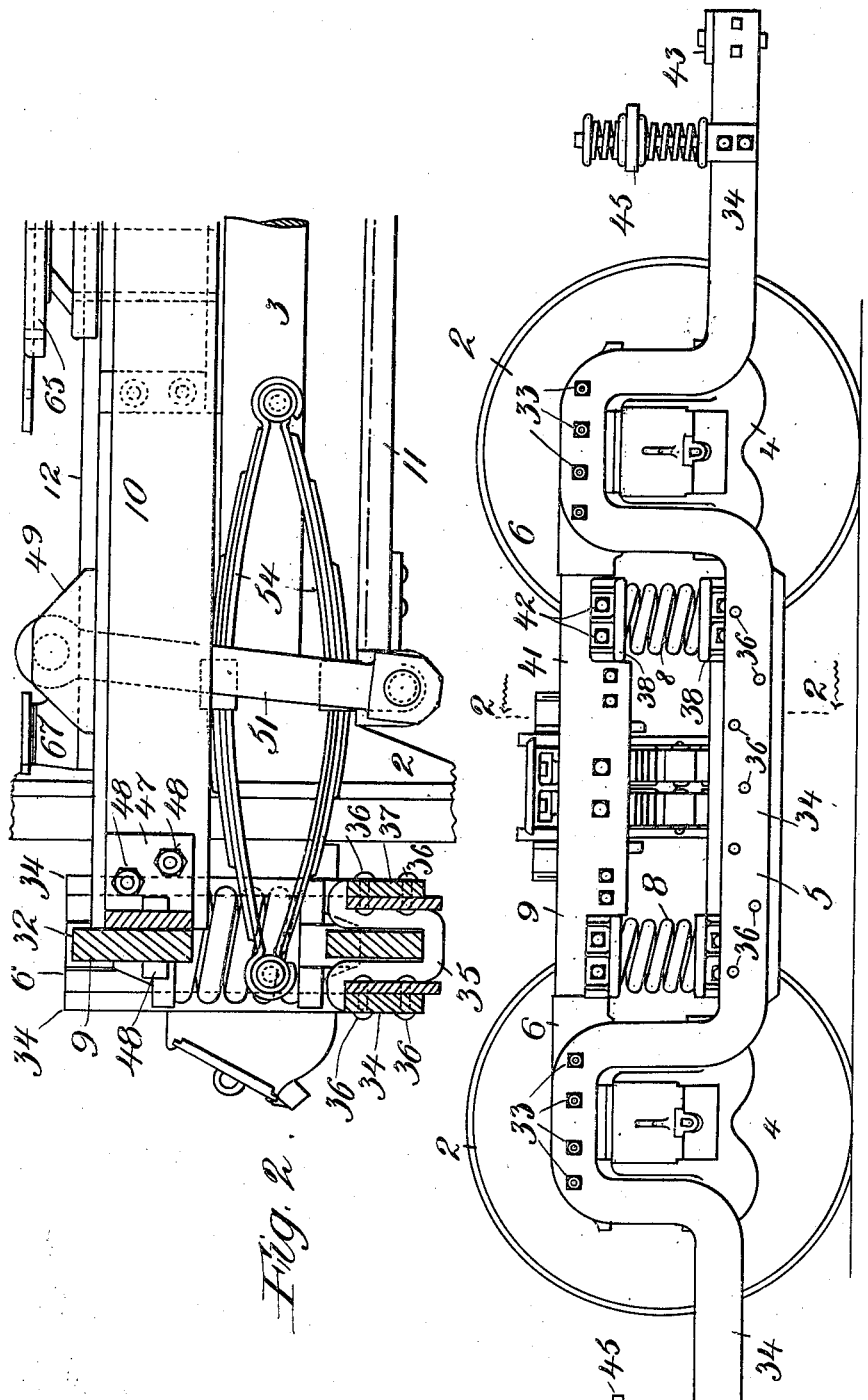

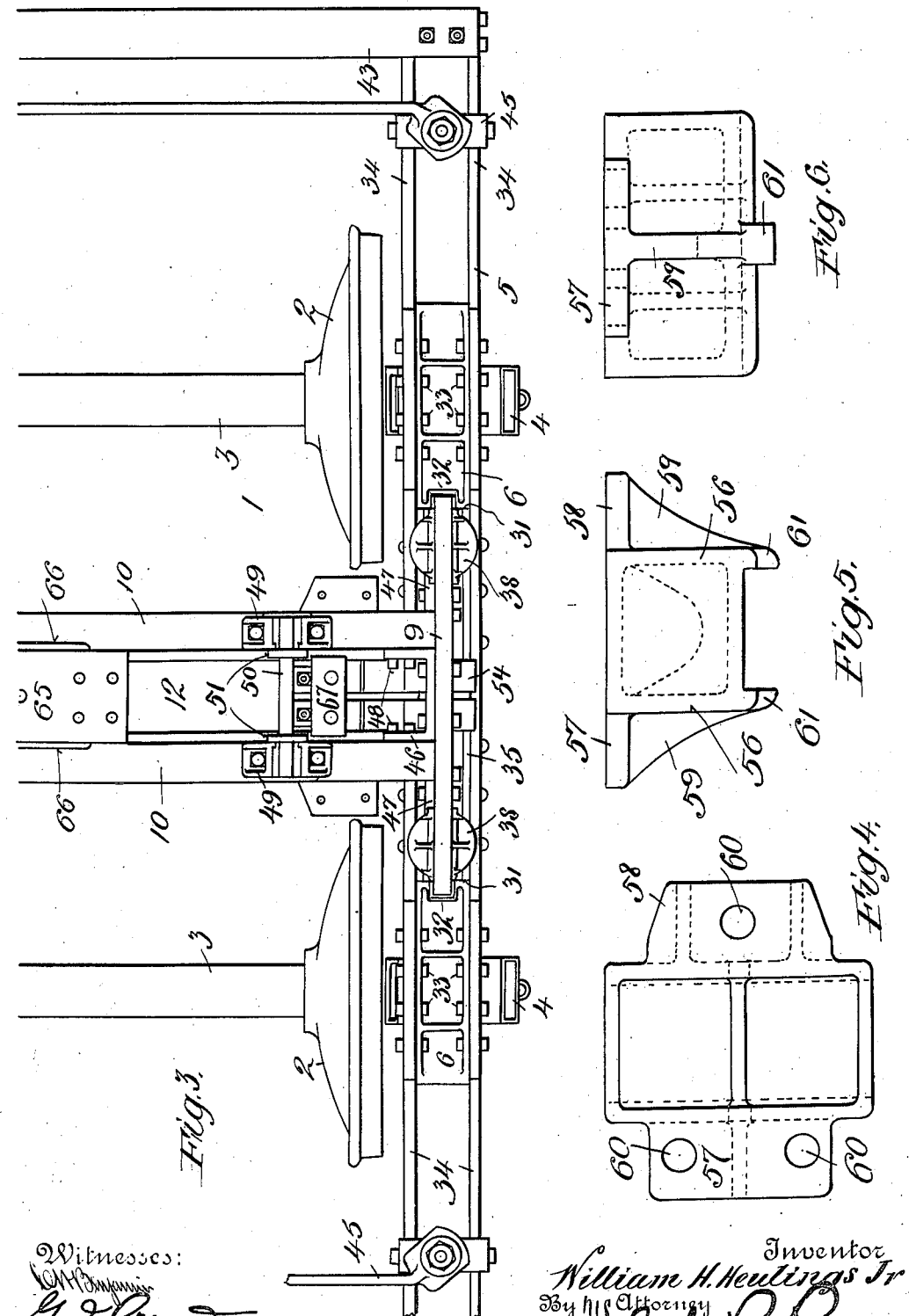

W. H. HEULINGS, Jr.
CAR TRUCK.
APPLICATION FILED MAY 25, 1909.
1,000,407.
Patented Aug. 15, 1911.
6 SHEETS—SHEET 3.
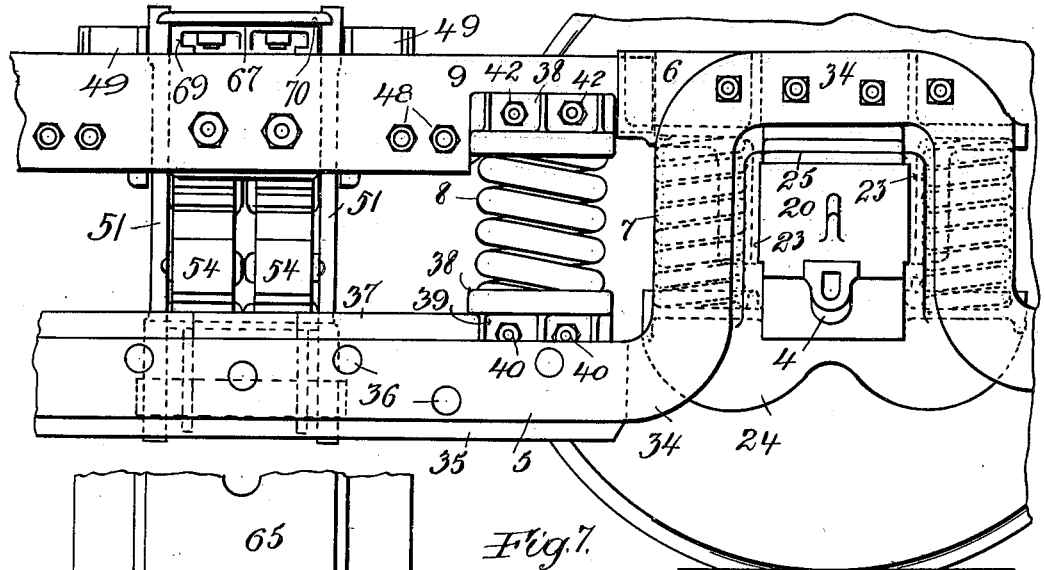
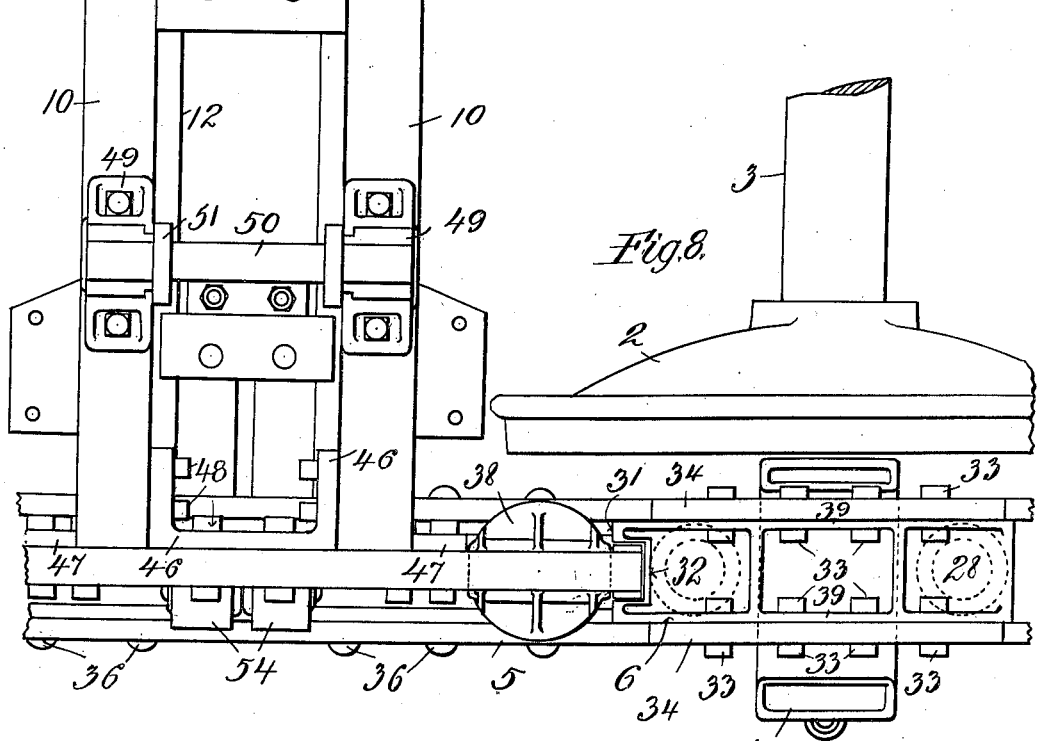

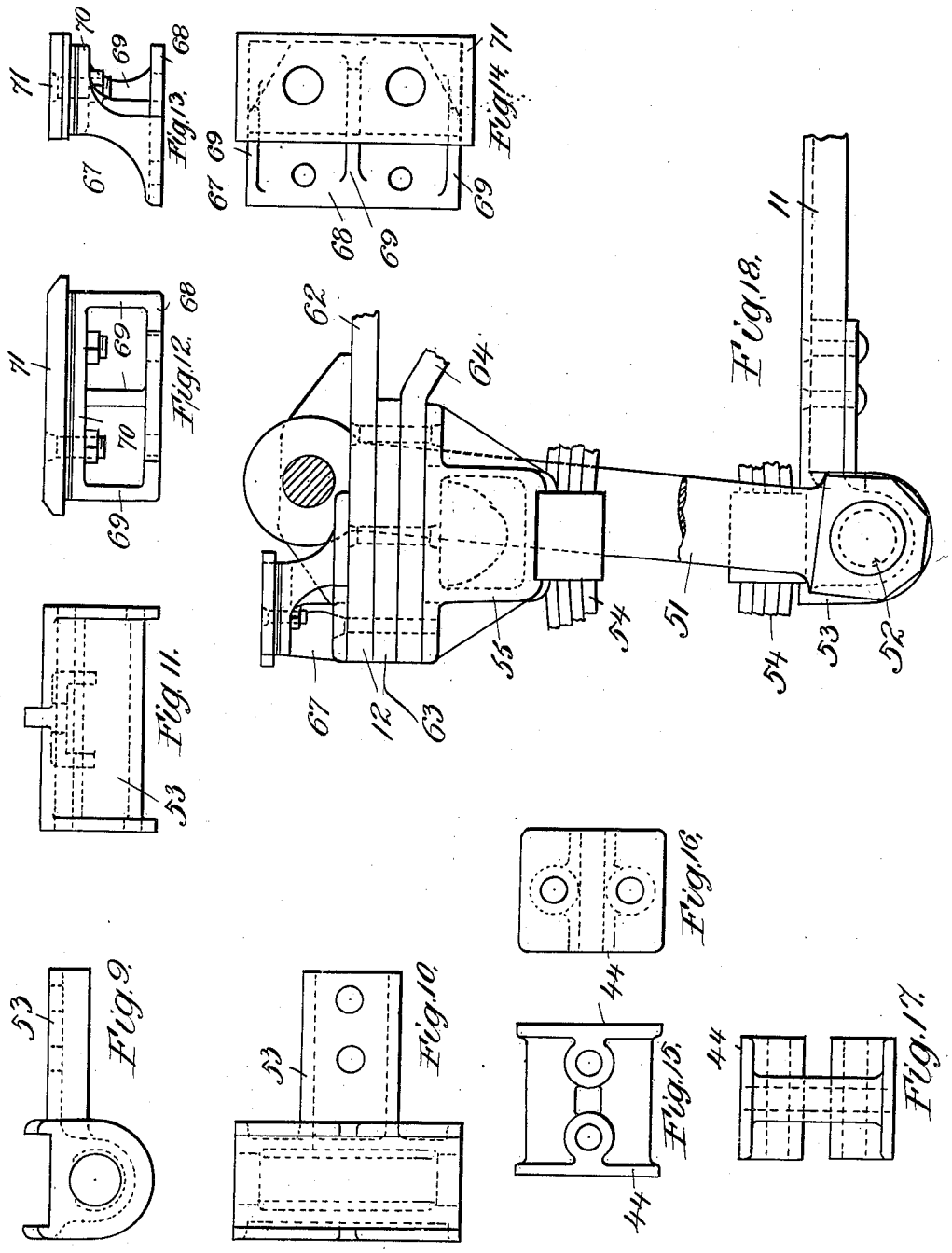

W. H. HEULINGS, Jr.
CAR TRUCK.
APPLICATION FILED MAY 25, 1909.
1,000,407.
Patented Aug. 15, 1911.
6 SHEETS—SHEET 5.
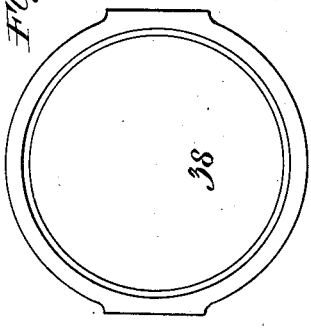
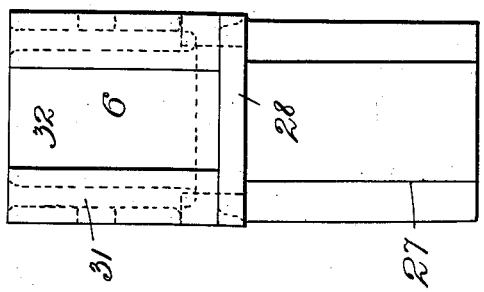
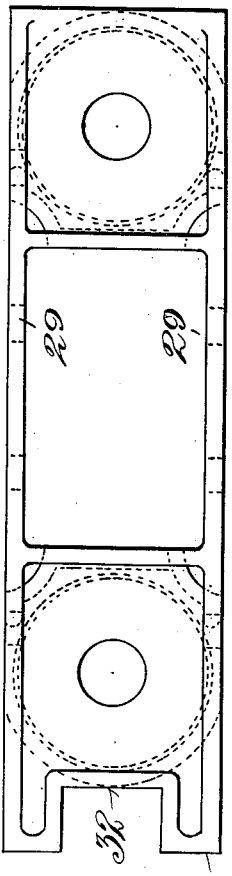
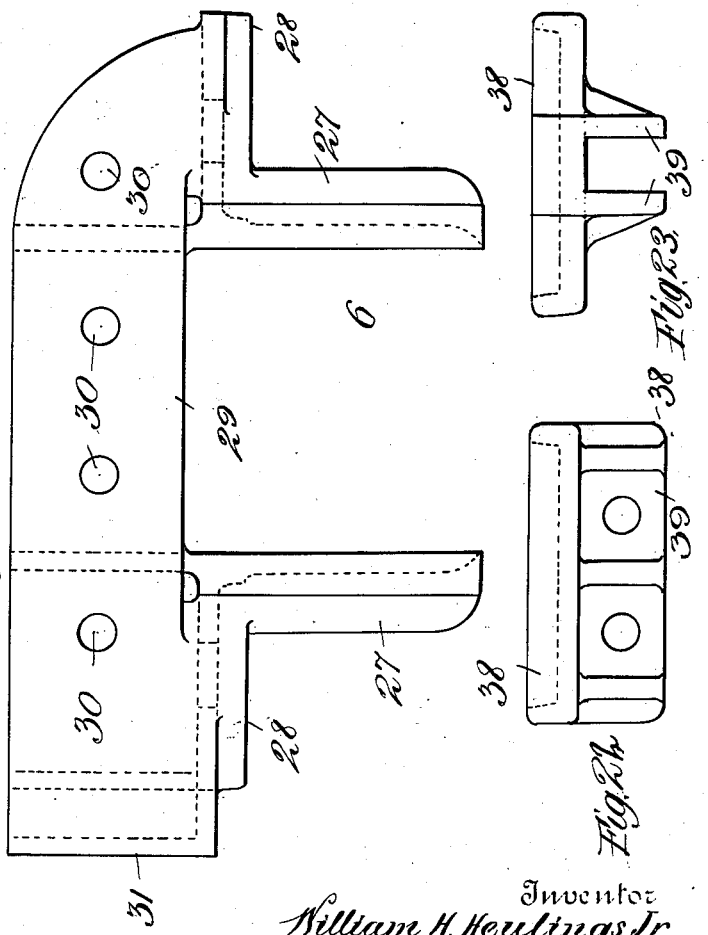
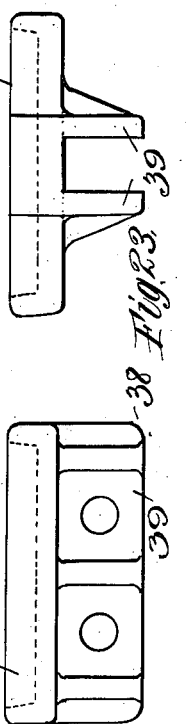

W. H. HEULINGS, Jr.
CAR TRUCK.
APPLICATION FILED MAY 25, 1909.
1,000,407.
Patented Aug. 15, 1911
6 SHEETS—SHEET 6.
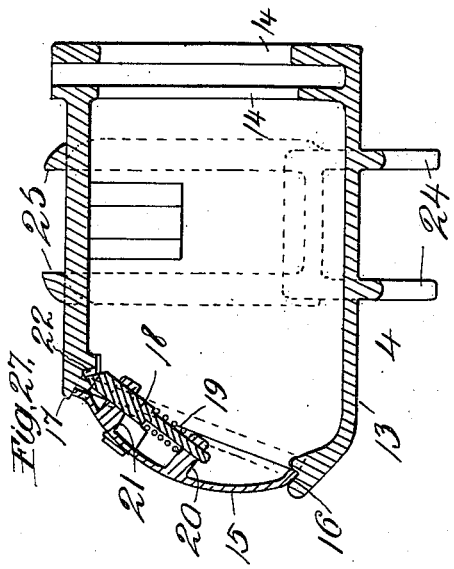
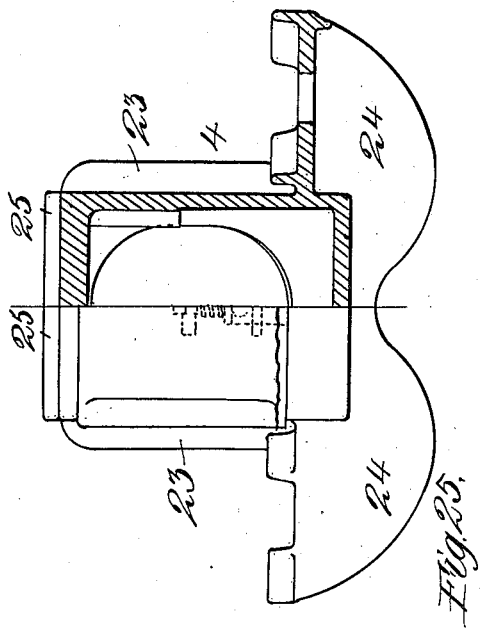
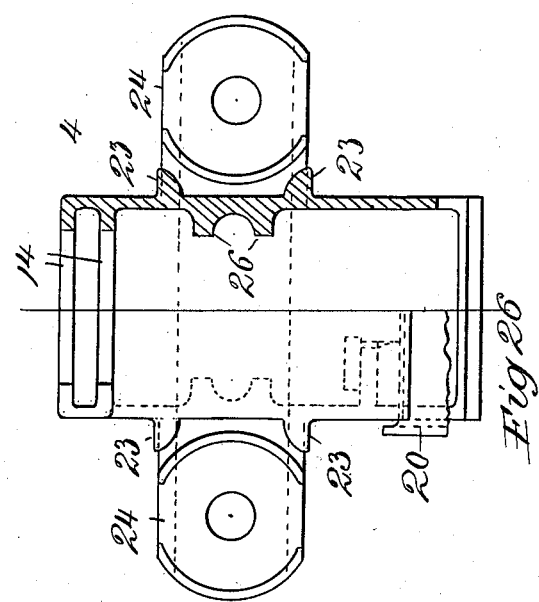

UNITED STATES PATENT OFFICE.

WILLIAM H. HEULINGS, JR., OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-TRUCK.

1,000,407.  Specification of Letters Patent.  Patented Aug. 15, 1911.

Application filed May 25, 1909. Serial No. 498,338.

*To all whom it may concern:*

Be it known that I, WILLIAM H. HEULINGS, Jr., a citizen of the United States, and a resident of the city and county of Philadelphia, State of Pennsylvania, have invented a new and useful Improvement in Car-Trucks, of which the following is a specification.

The object of my invention is to provide an improved truck of the type known as "Master Car Builders" with improvements in the various details of construction. This object is accomplished by my invention, which is hereinafter set forth. For a more particular description thereof, reference is to be had to the accompanying drawings, forming a part thereof, in which, Figure 1, is a side elevation of my improved truck. Fig. 2, is a sectional view taken on the line 2—2 of Fig. 1, looking in the direction of the arrows. Fig. 3, is a half plan view of my truck. Figs. 4, 5 and 6 are a plan, an end elevation and a side elevation respectively of the top cap for a semielliptic spring. Figs. 7 and 8 are an enlarged side elevation and plan view, respectively, of a portion of the truck. Figs. 9, 10 and 11 are a side elevation, a plan and an end elevation, respectively, of the lower cap for an elliptic spring. Figs. 12, 13 and 14 are a side elevation, an end elevation and a plan view respectively, of a side bearing of the truck. Figs. 15, 16 and 17 are detailed views showing an end spacing block for the side bars of the truck. Fig. 18 is a sectional view showing a portion of the bolster and spring plank and the links connecting the same, as well as other incidental parts. Figs. 19, 20 and 21 are a plan, a side elevation and an end elevation respectively, of a yoke which fits over axle box. Figs. 22, 23 and 24, are a side elevation, an end elevation and an inverted plan view, respectively, of the upper and lower caps of an equalizing spring. Figs. 25, 26 and 27 are a side elevation, a plan, and a sectional view respectively, of an axle box, partially in section, to more clearly reveal the structure.

Throughout the various views of the drawing similar reference characters designate similar parts.

My improved truck, 1, is provided with wheels 2, which are united by suitable axles 3, in the conventional manner. The axles run in suitable axle boxes 4, which carry the side frames 5, which are fixed to yokes 6, that rest on axle box springs 7, which are carried beside the axle boxes 4 and at each side thereof. The side frames 5 carry equalizing springs 8, which are united by top bar or chord 9 that carries the transoms 10 from which the sand plank 11 is supported and supports the bolster 12, as will be described below.

The axle boxes 4, each consist of the usual longitudinal barrel 13, which has flanges 14, at the wheel end and its other or outer end is closed by a suitable cover 15, which has its lower end projecting into a suitable recess 16 and its upper into a suitable recess 17. The cover 15, is locked in place by means of a bolt 18, pressed by a spring 19 and running through lugs 20 and 21 and controlled through a suitable recess so that it may be made to disengage a lug 22 in the barrel 13. The cover may be held in any suitable manner, the preferred embodiment being shown and described. The barrel 13, is also provided with laterally extending and external collars 23, which are adapted to receive and fit against the yoke 6 in a manner which will be described below. It is also provided with spring seats 24, which are preferably placed as shown, so that when the axle is in position and the truck is complete, the springs 7 will rest in said seats 24 and adjacent to said collars and flanges 23. On the top of the barrel 13, of the axle box 4, are parallel flanges 25, which are practically continuations of the flanges 23 and for the same purpose should the load on the springs, be sufficient to permit the yokes 6 to reach these flanges 25. The interior of the axle box 4 is of the conventional form, so that no detailed description thereof is necessary. It has the inwardly projecting flanges 26, placed in the usual manner.

The yoke 6, which is shown in detail in Figs. 19 to 21 inclusive, has two downwardly extending projections 27, adjacent to the horizontally disposed spring seats 28, so that when the yoke is in place, the spring 7 will be covered by the seats or caps 28 and the projections 27 are guided by the flanges 23. The projections 27 and spring caps 28 are connected by suitable vertical flanges or webs 29, which have suitable perforations or bolt holes 30 and at one end the parallel webs or flanges 29 are connected by a laterally disposed web 31, having an inwardly projecting and offset portion 32, to guide the bar 9. Each yoke 6, is secured to a side bar 34, by means of bolts 33. Each side frame 5, is composed of two parallel bars 34, each of which is bolted to the yoke 6 by means of the said bolts 33 and both are shaped substantially as shown, so as to have portions passing on three sides of each axle box and projecting so as to form a motor supporting extension outside the wheel base. The side frames also include suitable spacing means as will appear below.

The parts within the wheel base and between the axle boxes are united by suitable spacing blocks 35, each of which consists of a U shaped member with flanges which are riveted by rivets 36 to the bars 34 and the U shaped members having suitable flanges resting on the bars 34. The U shaped members 35 each carry a bar 37 to which are bolted the lower equalizing spring caps 38, which carry the equalizing springs 8. Each cap 38 is composed of a disk with an annular flange, which forms a side for the spring and on its opposite face has suitable flanges 39, which are adapted to be fixed to the bar 37 by means of bolts 40. The upper caps 38 are identical with the lower in all respects and are fixed to a top chord 9 by means of bolts 42. The bar 9 projects beyond the upper caps 38 and terminates in the offset portion 32 of the yoke 6, so that it is free to move vertically but not otherwise when the truck is in use. The extreme ends of the bars 34 are united by suitable crossings 43, which are bolted to suitable spacing blocks 44, shown in Figs. 15, 16 and 17 respectively. The spacing blocks 44 are bolted to the bars 34 and separate the bars of each side frame and have suitable flanges and perforations in sets, each set of perforations consisting of a pair at right angles to the plane of another pair. They are also bolted to the crossing 43. The bars 34 also carry suitable motor supporting gears 45, which may be of the conventional form.

The bars 9 are connected together by means of the transoms 10 which are bolted to interior angles 46 and exterior angles 47 by means of suitable bolts 48. Some bolts 48 also hold the angle 46 to the top chord 9. The transoms 10 carry brackets 49, in which is journaled a shaft 50, from which are suspended the links 51, which are downwardly and outwardly splayed and at their lower ends united by a shaft 52, which is journaled in the lower elliptic spring cap 53, which cap supports the spring plank 11. The spring cap 53 carries a pair of parallel elliptic springs 54 on which rests the upper spring caps 55, which carry the bolster 12. The caps 55 are preferably shaped as shown in Figs. 4, 5 and 6, that is with parallel and vertical webs 56, laterally extending horizontal webs 57 and 58 and supporting webs 59, together with suitable bolt holes 60, in the horizontal webs and any desired number of reinforcing webs. A vertically disposed web 61 separates the caps of the tow elliptic springs. The bolster 12, which is carried by the cap 55, has a horizontally disposed top bar 62, an intermediate plate 63 and the bottom bar 64, which rests on the cap 55. The bar 64 is downwardly and diagonally disposed between the caps 55, and the center and may be provided with a filling which rests thereon and separates it from the top bar 62. In any event, this bottom bar is suitably connected to the top bar so as to aid it in supporting a center bearing 65, which is supported in the conventional manner, and separated from the transoms 10 by suitable rub plates 66. The ends of the bolster 12 are each provided with a suitable side bearing 67, which preferably consists of a base 68, adapted to be bolted to the top bar 62, vertically and upwardly extending webs 69, a horizontally disposed web 70, to which is bolted or otherwise secured a suitable wear plate 71, which is adapted to rub against a suitable surface placed on the car body, which is carried by the truck.

When my improved truck is in use, the load is carried by the bolster 12, through the center and side bearings 65 and 67 respectively. This bolster transmits the stresses to the elliptic springs 54, and thence to the displayed links 51, which through the brackets 49 and shaft 50, transmit the stresses to the transoms 10. From the transoms 10, the stresses are distributed through the top chords 9 to the equalizing springs 8 and through the side frames to the axle box springs 7. The axle box springs 7 are made unusually large and powerful and resilient, so as to absorb all shocks due to small irregularities of the track. The result of the construction above described is an easy riding and durable truck where the stresses are well distributed and equalized.

While I have shown one embodiment of my invention, it is obvious that it is not restricted thereto, but is broad enough to cover all structures that come within the scope of the annexed claims.

What I claim is:—

1. In a truck of the class described an axle box; a yoke on each of said axle boxes; side bars, fixed to said yokes, equalizing springs supported by said side bars, top chords vertically movable in said yokes and supported by said equalizing springs from said side bars and means for supporting a car body connected to said top chords.

2. In a truck of the class described axle boxes, axle box lugs extending laterally from said axle boxes, springs supported by said lugs, yokes straddling each of said axle boxes and supported by the springs thereof, side bars fixed to said yokes, equalizing springs supported by said side bars, top chords supported by said equalizing springs and means on each of said yokes for guiding said top chords in their vertical movement.

3. In a truck of the class described, axle boxes with spring seats thereon, axle box springs on said seats, a yoke straddling each of said axle boxes and supported by said springs, side bars at each side of the truck and fixed to said yokes, a bar carried by said side bars, a spring seat at each end of said bar, equalizing springs on each of said seats, caps on said springs, top chords uniting said caps on each side of said truck and adapted to move vertically between said yokes, transoms uniting said top chords and means for supporting a car body from said transoms.

4. In a truck of the class described axle boxes and means for supporting axle box springs on each side of each axle box, a yoke on each axle box supported by the said springs, side bars fixed to said yokes and extending on three sides of said axle boxes, spacing means separating the said axle boxes, a bar carried by each of said spacing means, spring seats on said bar, equalizing springs on said seats, a spring cap on each of said springs, a top chord uniting each pair of equalizing springs and means for supporting a car body from said top chords.

5. In a truck of the class described, a side frame composed of yokes with bent bars fixed each side thereof; a U-shaped bar fixed to said bent bars and a straight bar carried by said spacing bar, a spring seat at each end of said spacing bar, an equalizing spring carried by each of said seats, a cap on each of said equalizing springs, a top chord uniting said caps and extending between said guides, so that said top chord has a vertical movement only with regard to said side frame.

6. In a truck of the class described, side frames with guides thereon comprising a U-shaped bar, a spring seat at each end of said bar, equalizing springs supported by said seats, a top chord carried by said equalizing springs and extending between said guides to have a vertical movement only with regard to said side frames, transoms connecting said top chord, links supported from said transoms, a spring plank uniting the lower ends of said links, elliptical springs supported by said links and a bolster supported by said elliptical springs.

7. In a truck of the class described, a yoke provided with vertically disposed webs 29, horizontally disposed spring caps 28, downwardly extending lugs 27 adapted to fit on each side of an axle box and an end 31, with an offset portion 32 adapted to form a guide for a top chord.

8. In a truck of the class described, a side frame composed of yokes 6, bars 34, fixed to each side of said yokes, a U-shaped spacing bar 35 and a bar 37 carried by said U-shaped spacing bar.

9. In a truck of the class described side frames, composed of yokes 6, bars 34, spacing blocks 44 at each end of said bars 34, a spacing bar 35 and a bar 37, supported by said spacing bar 35.

10. In a truck of the class described, a bolster composed of a top bar 62, a spacing plate 63 and a bottom bar 64, with a diagonally disposed portion, and an elliptic spring cap 55, fixed to said bar 64.

11. In a truck of the class described, a spring cap 55, composed of horizontally disposed webs 57 and 58 and vertically disposed web 56 and 59 and projecting lugs 61.

12. In a truck of the class described, a spacing bar 35, having a portion adapted to rest on bars 34 and having another portion adapted to be fixed to said bars 34.

13. In a truck of the class described, a side bearing 67 composed of upper and lower horizontally disposed webs 68 and 70 united by vertically disposed webs 69 and a rub plate 71 on said web 70.

Signed in the city and county of Philadelphia, State of Pennsylvania, this 26th day of April, 1909.

WM. H. HEULINGS, JR.

Witnesses:
WARREN M. SMITH,
A. N. HARGROVE.